United States Patent
Eisbach et al.

(10) Patent No.: US 6,341,061 B1
(45) Date of Patent: Jan. 22, 2002

(54) STANDUP NOTEBOOK COMPUTER

(75) Inventors: Christopher Eisbach; Eric Andrew Knopf, both of Mountain View; Derek Solomon Pai, Redwood City, all of CA (US); Ramiro Ramirez, Apex, NC (US); Edwin Joseph Selker, Cambridge, MA (US); Todd C. Wyant, Morgan City, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/473,320

(22) Filed: Dec. 28, 1999

(51) Int. Cl.[7] ................................. G06F 1/20
(52) U.S. Cl. .................... 361/687; 361/697; 312/223.7; 345/905
(58) Field of Search .................... 361/687, 679–681, 361/683, 695, 697, 682, 684, 686; 345/168, 169, 905; 312/223.1–223.7

(56) References Cited

U.S. PATENT DOCUMENTS

| | | | |
|---|---|---|---|
| 5,276,589 A | 1/1994 | Bartlett et al. | 361/681 |
| 5,483,418 A * | 1/1996 | Hosoi | 361/680 |
| 5,539,615 A | 7/1996 | Sellers | 361/680 |
| 5,629,832 A | 5/1997 | Sellers | 361/680 |
| 5,644,338 A | 7/1997 | Bowen | 345/168 |
| 5,796,577 A | 8/1998 | Ouchi et al. | 361/681 |
| 5,808,662 A * | 9/1998 | Robbins | 361/681 |
| 5,926,364 A | 7/1999 | Karidis | 361/681 |
| 6,006,243 A * | 12/1999 | Karidis | 361/680 |
| 6,185,096 B1 * | 2/2001 | Helot et al. | 361/686 |
| 6,191,940 B1 * | 2/2001 | Ma | 361/681 |
| 6,229,693 B1 | 5/2001 | Karidis et al. | 361/681 |

OTHER PUBLICATIONS http://www.clio.com and http://www.connectronics.com, web site pages describing features of Clio (TM) products by Vadem Mobile Computing and Communications Solutions, 1960 Zanker Road, San Jose, CA 95112.

* cited by examiner

Primary Examiner—Leo P. Picard
Assistant Examiner—Hung Van Duong
(74) Attorney, Agent, or Firm—Marc D. McSwain

(57) ABSTRACT

A notebook computer operable in the normal clamshell-type arrangement and also capable of being physically reconfigured to enhance heat dissipation and to improve user ergonomics by placing the main body and a pivotably attached display into a substantially vertical orientation, thereby raising the display to a higher and more convenient position. The keyboard may be lowered and pivoted downward to a horizontal support surface to further enhance user comfort. The depth of the notebook computer is minimized to facilitate use in situations where user space is limited. The main body may be used as an easel to hold reference materials for easy viewing. Means for mechanically supporting the main body and attached display in the substantially vertical orientation are also disclosed. The main body may also include a second display facing the user.

19 Claims, 21 Drawing Sheets

STANDUP NOTEBOOK COMPUTER

FIELD OF THE INVENTION

This invention relates to notebook computers and more specifically to a notebook computer physically configured for enhanced heat dissipation and improved ergonomics.

DESCRIPTION OF RELATED ART

Conventional notebook computers generally employ a clamshell design in which upper and lower hinged pieces move apart to reveal an inner top surface and an inner bottom surface. The upper hinged piece usually includes a backlit liquid crystal display. The lower hinged piece usually includes all other components of the computer, such as a cpu, random access memory, a direct access storage device, a pointing device, a battery, and a keyboard disposed on the inner bottom surface.

Heat dissipation is frequently a problem with conventional notebook computers. The lower hinged piece is positioned horizontally, usually very close to a horizontal support surface. Convective airflow around the lower hinged piece is therefore very limited, so heat tends to build up within the lower hinged piece. Excessive heat can damage the components of the computer and reduce the reliability of computer operations.

Additionally, the display of a conventional notebook computer is positioned just above the hinge, so the bottom of the display is located only slightly above the lower hinged piece. This relatively low display position may be uncomfortable for many users. Further, the display typically tilts back from the hinge by three to four inches. Since the lower hinged piece is often eight and one-half inches or more in depth, the total depth of the computer including the lower hinged piece and the tilted upper hinged piece can easily exceed twelve inches. This depth can cause problems when a user attempts to operate the computer on a small seatback tray in an airplane.

Finally, the keyboard of a conventional notebook computer is attached to the top of the lower hinged piece, which is often about two inches above the horizontal support surface. This disposition of the keyboard limits user flexibility. Some users would prefer a keyboard that is closer to the horizontal support surface (e.g. a desktop, an airline seatback tray, or one's lap) and that does not rest on top of the lower hinged piece.

A notebook computer capable of operating in a configuration that enhances heat dissipation and provides better display and keyboard ergonomics is therefore needed.

SUMMARY OF THE INVENTION

It is accordingly an object of this invention to devise a notebook computer having a main body, including many of the heat-generating computer components, standing in a substantially vertical position so that heat may radiate from both the front and back surfaces of the main body, and so that heat may dissipate more efficiently via convection.

It is a related object that the display of the notebook computer of the present invention should be pivotably attached to the main body and located above the main body in a substantially vertical orientation, such that the display is in a higher, less tilted, more ergonomically correct position than is the case with a conventional notebook computer configuration.

It is a related object that the notebook computer of the present invention should include means for supporting the main body in a substantially vertical position and for providing lateral mechanical stability. The means may include a base frame into which the main body slides via pin-and-channel mechanisms. The means may also include hinged side struts enabling the keyboard to unfold from the main body. Folding rear struts that unfold to form support members when the user removes the keyboard from the main body may also be included. The battery may also serve as a support member for the main body when pivotably unfolded from the main body.

It is a related object that the keyboard may be separated if not entirely detached from the main body of the notebook computer of the present invention for use on a horizontal support surface, such that the keyboard height is less than the keyboard height of a conventional notebook computer.

It is a related object that electrical signals may be conducted between the main body and the keyboard of the notebook computer of the present invention via a set of pins that also function to mechanically interconnect the keyboard to the notebook computer.

It is a related object that the main body may include a second display on its front surface for those situations where two displays facing the user would increase the utility of the notebook computer of the present invention. One display may be used for the Windows (R) desktop, for example, and the other may be used exclusively by a single application.

It is a related object that the notebook computer of the present invention may also operate in the normal clamshell configuration.

It is a related object that the notebook computer of the present invention be configurable from its closed state to its fully deployed state by a user's hands in one smooth motion.

The foregoing objects are believed satisfied by the notebook computer of the present invention as described below.

DESCRIPTION OF THE PREFERRED EMBODIMENT

Figure 1:
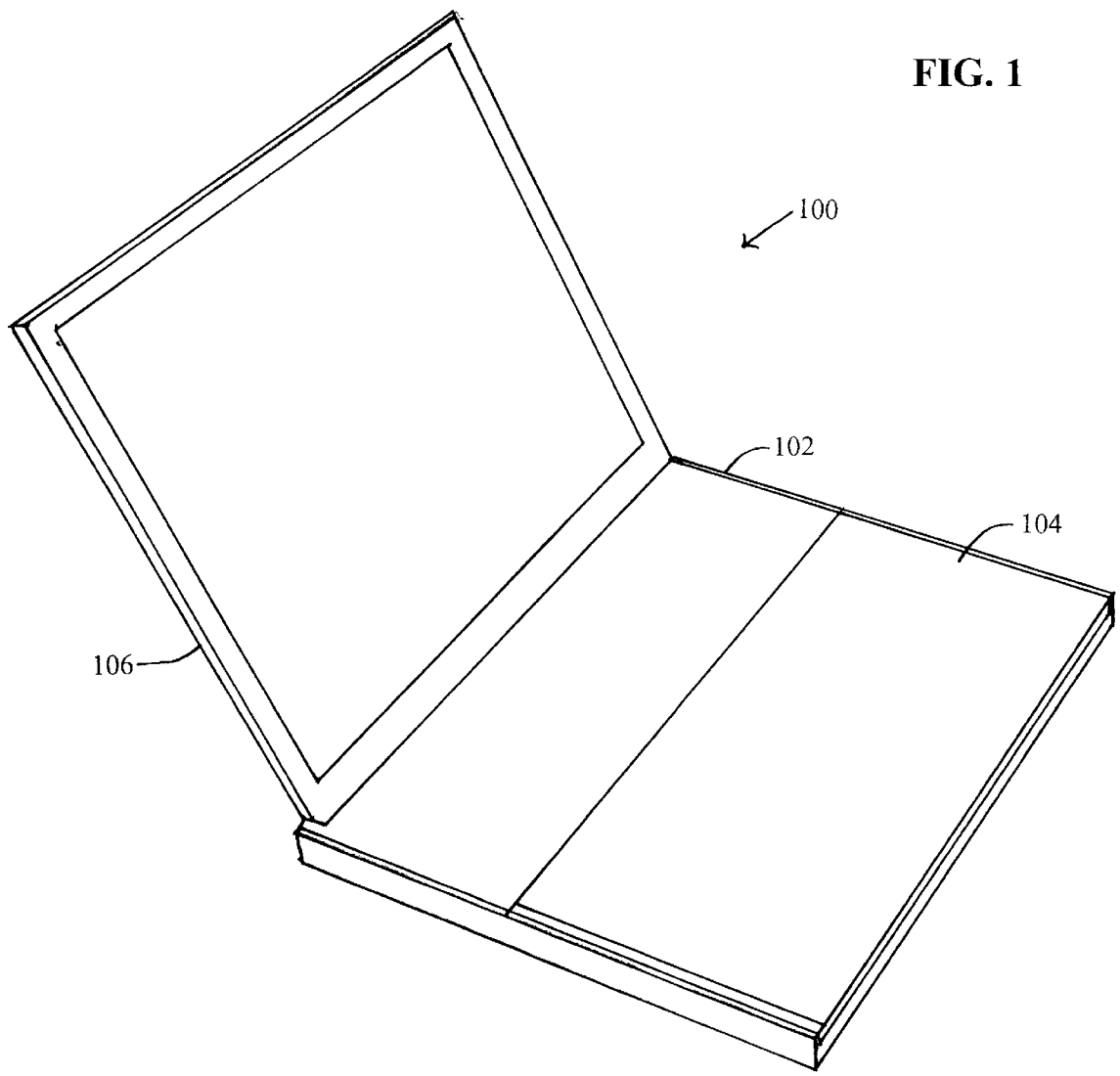
FIG. 1 is a perspective drawing of the preferred embodiment of the notebook computer according to the present invention in its conventional configuration.

Referring now to FIG. 1, the preferred embodiment of notebook computer 100 according to the present invention in its conventional configuration is shown. In this figure, notebook computer 100 is opened for use but is not fully deployed. Main body 102 rests on a horizontal support surface. Keyboard 104 rests on top of main body 102, and display 106 is pivotably attached to main body 102. This configuration leaves much to be desired when considering user ergonomics. Many users would prefer to have display 106 higher above the horizontal support surface, and would prefer keyboard 104 to be positioned lower and at an angle for comfortable typing. This configuration is also not optimal for heat dissipation. While heat may radiate away from the upper part of main body 102, the heat radiated from the lower part of main body 102 will only heat the horizontal support surface or a thin layer of air essentially trapped between main body 102 and the horizontal support surface.

The preferred apparatus for enhancing heat dissipation and user ergonomics is shown in detail in the next several figures, and further comprises pivot pins 108 enabling keyboard 104 to rotate downward to rest on the horizontal support surface, and a base frame 110 in which main body 102 may slide and then rotate into a substantially vertical orientation. The vertical orientation of main body 102 allows heat to radiate away from either side of main body 102, and enhances convective heat dissipation by enabling cooling air to freely flow over either side of main body 102.

Figure 2:
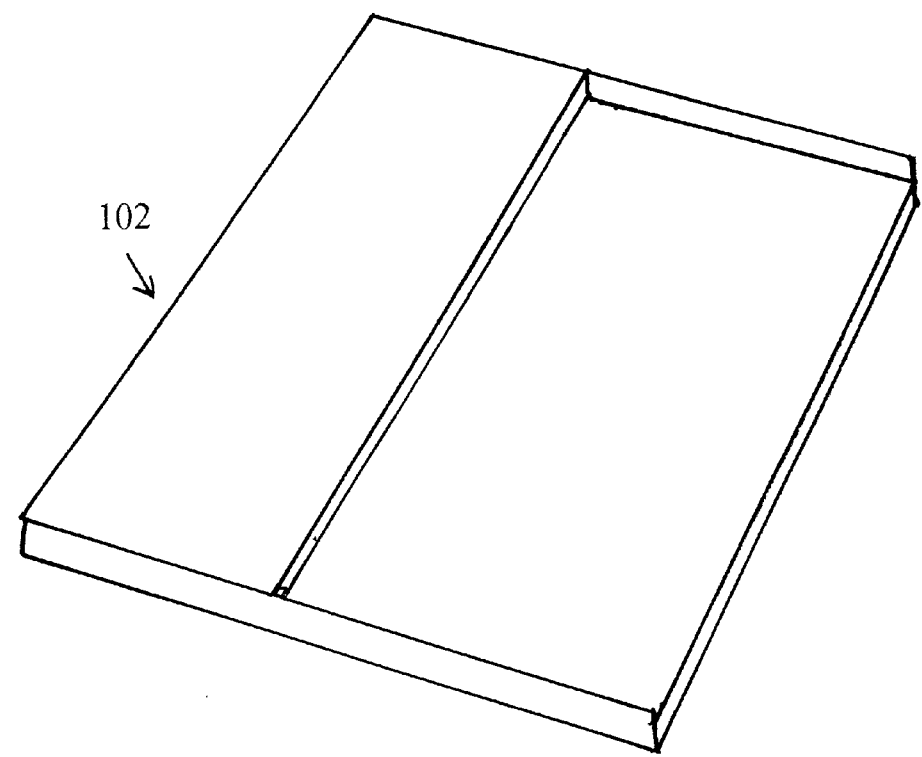
FIG. 2 is a perspective drawing of the main body shown separated from the base frame and keyboard of the preferred embodiment of the notebook computer according to the present invention.
Figure 2:
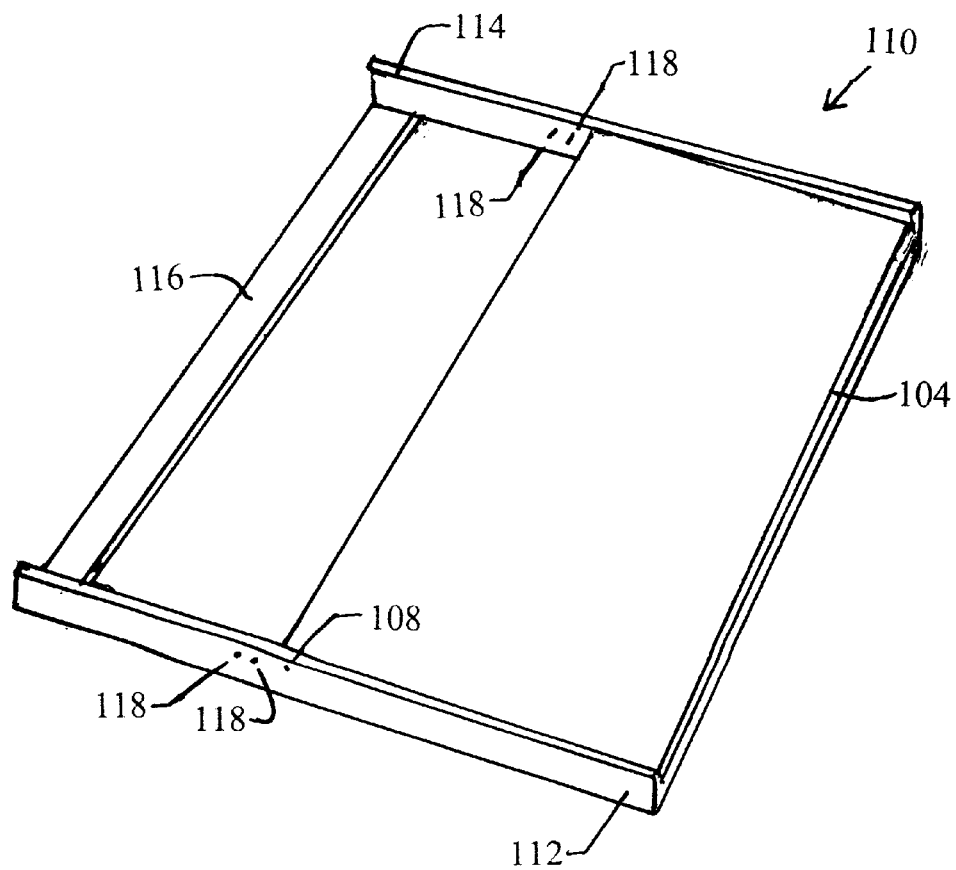

Referring now to FIG. 2, main body 102 is shown separated, for clarity, from base frame 110 and keyboard 104 of the preferred embodiment of the notebook computer according to the present invention. In normal operation, main body 102 will not detach completely from base frame 110 as shown. Base frame 110 comprises a left vertical side 112, a right vertical side 114, a bottom member 116, and sliding pins 118. Each side of base frame 110 has two sliding pins 118. Bottom member 116 may alternately comprise a thin monolithic slab running the entire length of left and right vertical sides 112 and 114, which is usually eight and one half inches. Keyboard 104 is retained within base frame 110 by pivot pins 108, which extend into upper corners of keyboard 104 on either side. In this application, similar and symmetric parts are used on the left and the right sides of notebook computer 100 except where noted.

Figure 3:
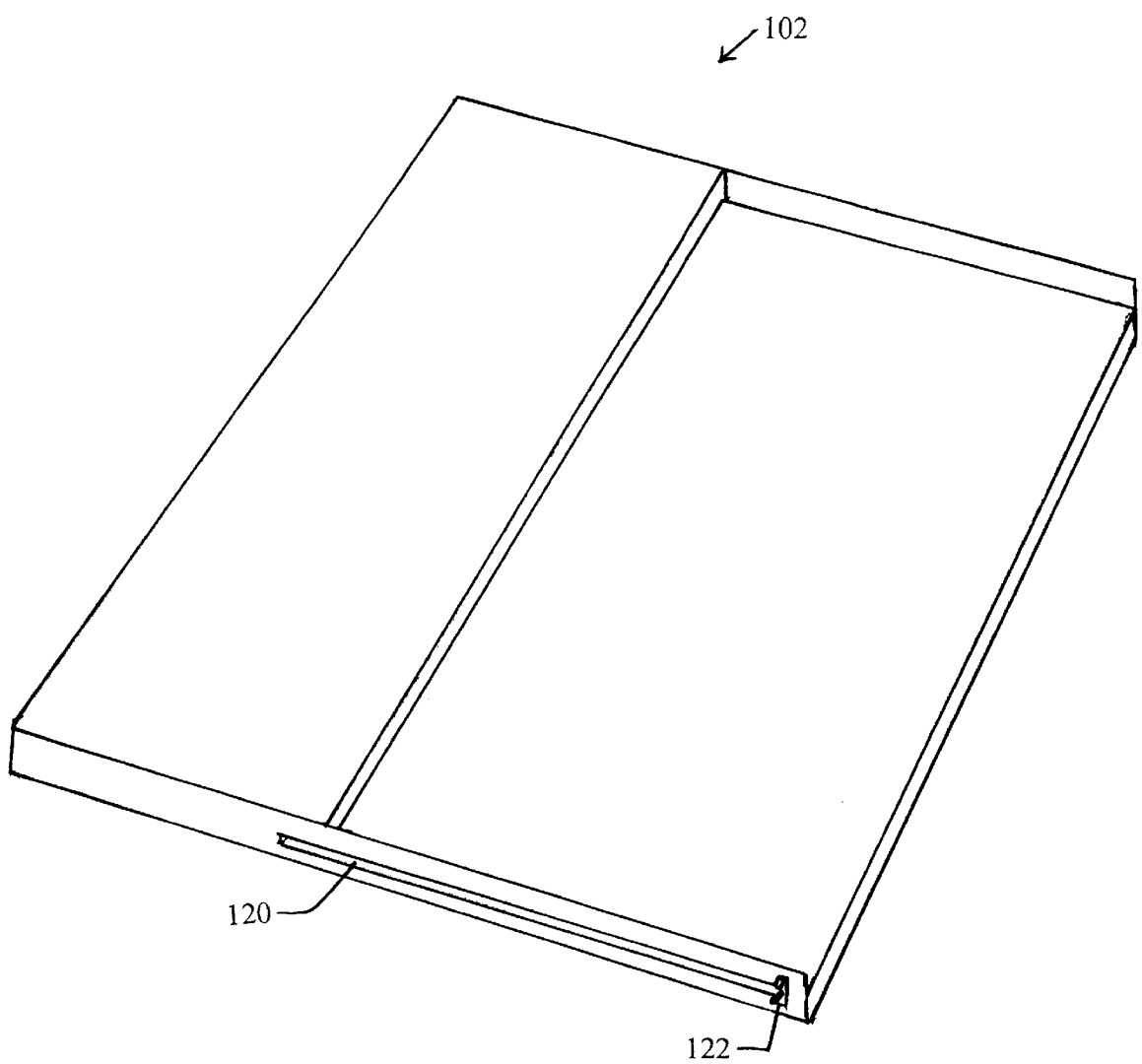
FIG. 3 is an enlarged perspective drawing of the main body of the notebook computer of the preferred embodiment depicting a guide channel and a transverse guide channel portion according to the present invention.

Referring now to FIG. 3, main body 102 of notebook computer 100 of the preferred embodiment including guide channels 120 and transverse portions 122 according to the present invention is shown. Sliding pins 118 extend inward from left vertical side 112 and right vertical side 114 into guide channels 120 to retain main body 102 within base frame 110.

Figure 4:
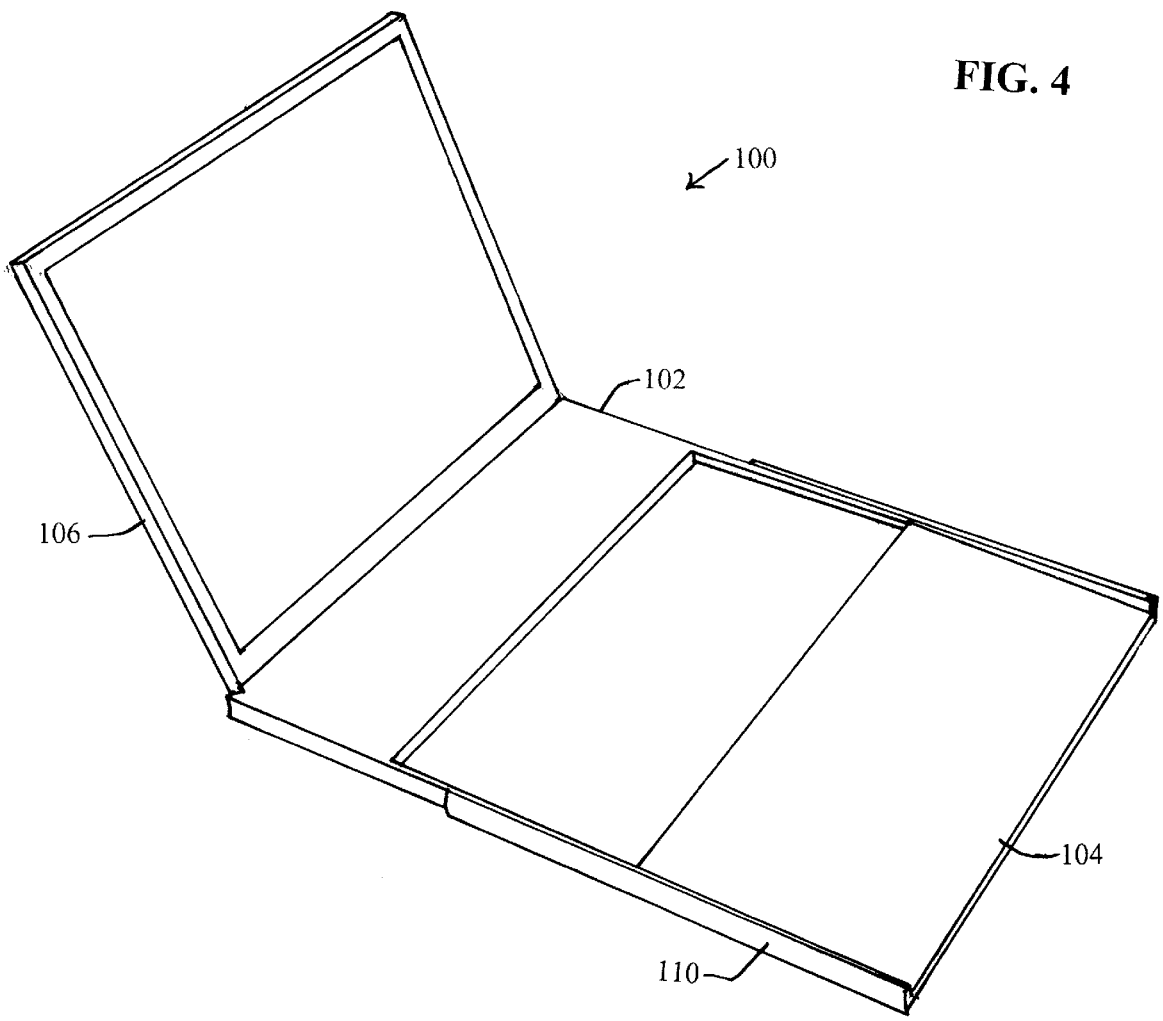
FIG. 4 is a perspective drawing of the preferred embodiment of the notebook computer, in which the main body has translated away from the keyboard, according to the present invention.

Referring now to FIG. 4, the preferred embodiment of notebook computer 100, in which main body 102 has translated away from keyboard 104, according to the present invention is shown. Main body 102 is free to slide rearward within base frame 110. Once keyboard 104 is no longer resting on main body 102, it is free to rotate downward on pivot pins 108 to rest in a slightly angled position upon bottom member 116, or, alternately, directly upon the horizontal support surface.

Figure 5:
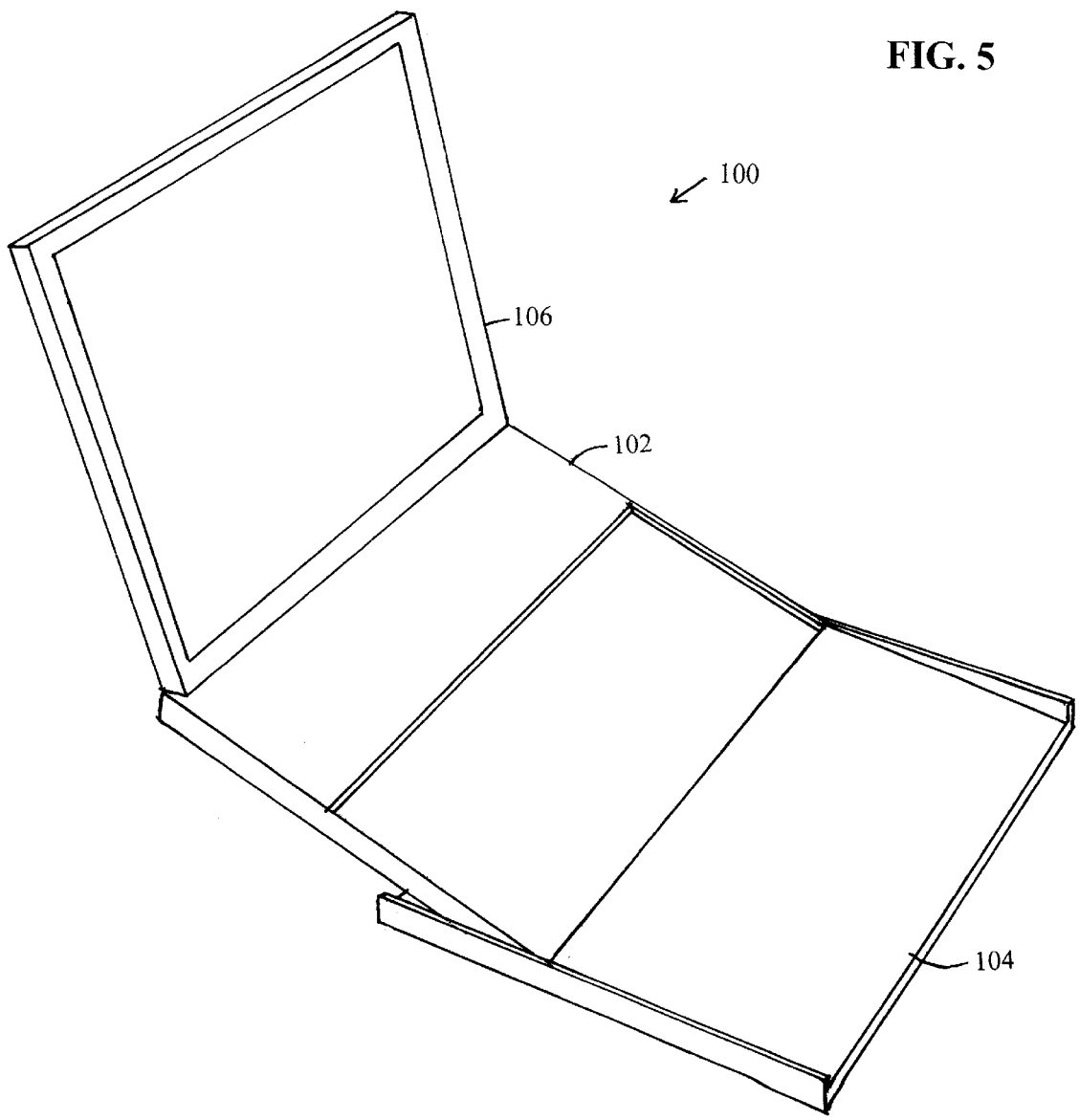
FIG. 5 is a perspective drawing of the preferred embodiment of the notebook computer, in which the main body has begun to rotate and rise vertically, according to the present invention.

Referring now to FIG. 5, the preferred embodiment of notebook computer 100 is shown, in which main body 102 has begun to rotate and rise vertically, according to the present invention.

Figure 6:
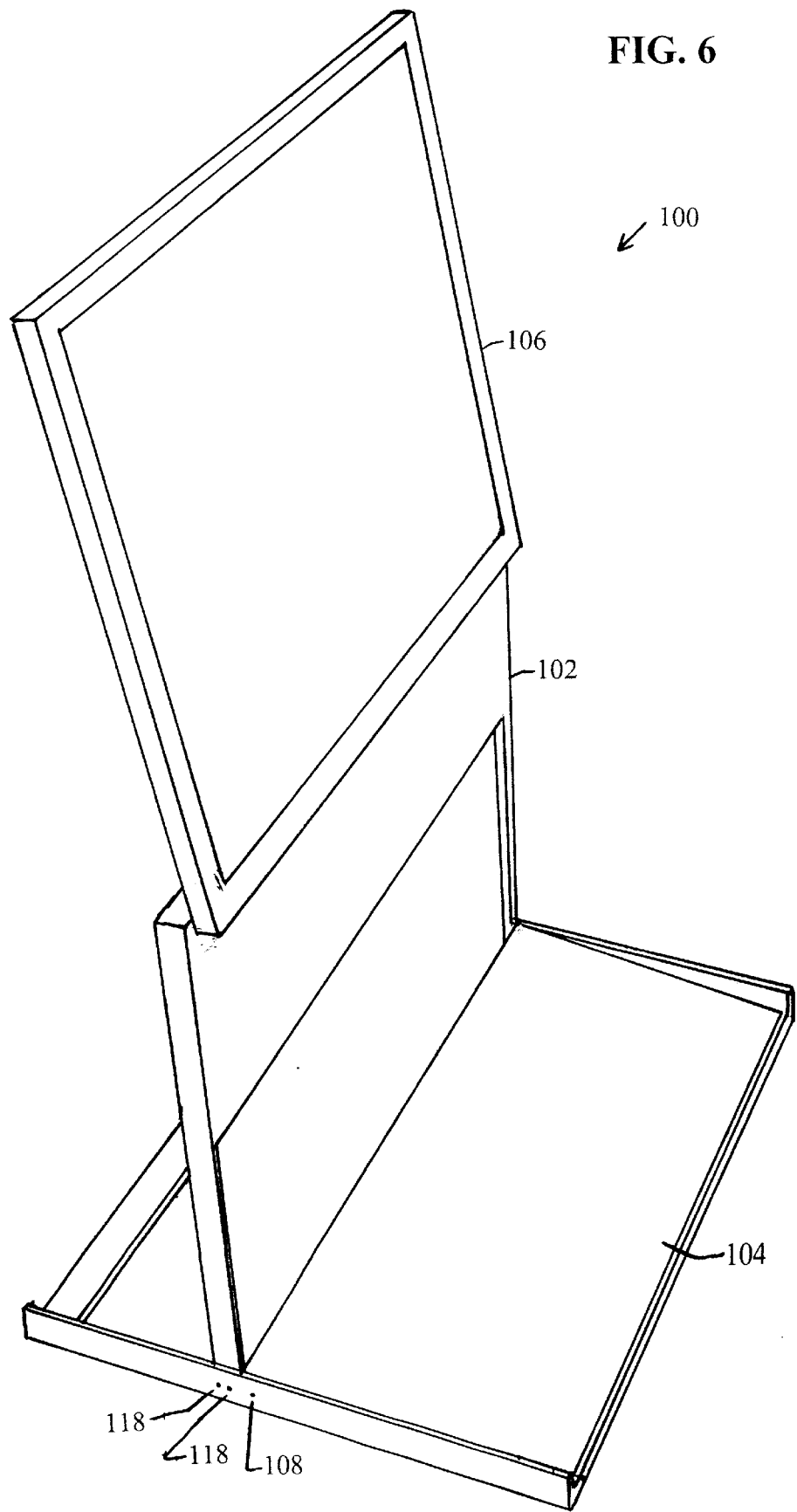
FIG. 6 is a perspective drawing of the preferred embodiment of the notebook computer in its fully deployed configuration, according to the present invention.

Referring now to FIG. 6, the preferred embodiment of notebook computer 100 is shown in its fully deployed configuration, according to the present invention.

Figure 7A:
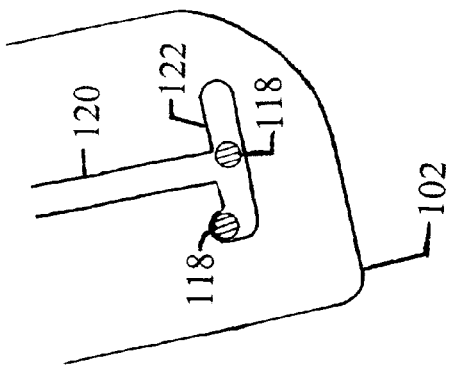
FIGS. 7A through 7D are side views of the main body during deployment of the preferred embodiment of the notebook computer relative to the sliding pins of the base frame.
Figure 7B:
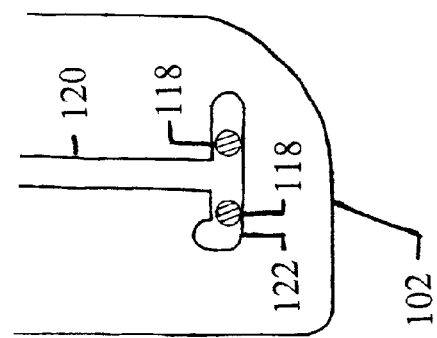
Figure 7C:
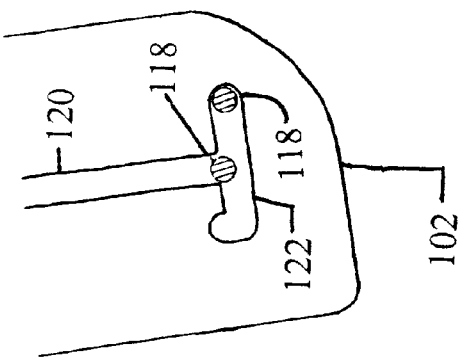
Figure 7D:
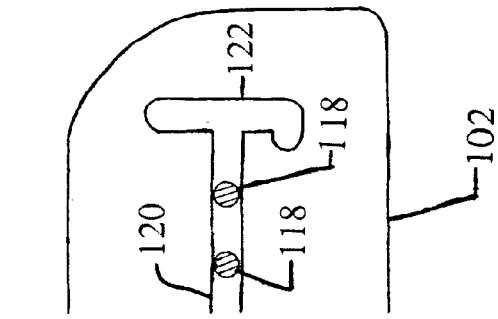

Referring now to FIGS. 7A through 7D, the motion of main body 102, relative to sliding pins 118 of base frame 110 is shown. In FIG. 7A, main body 102 slides from right to left in correspondence with FIG. 4. In FIG. 7B, main body 102 is free to rotate upward when sliding pin 118 engages the upper side of transverse portion 122 in correspondence with FIG. 5. In FIG. 7C, main body 102 is vertical and sliding pins 118 are within transverse portion 122, and finally in FIG. 7D main body 102 tilts back slightly so that the leftmost sliding pin 118 locks into transverse portion 122 in correspondence with FIG. 6. The weight of main body 102 serves to retain sliding pins 118 within transverse portions 122 as shown, thus holding main body 102 in a substantially vertical orientation. The weight of base frame 110 and keyboard 104 provide further mechanical stability for main body 102.

Display 106 then rotates during deployment by the user to also stand in a substantially vertical orientation. Display 106 is therefore less tilted than in conventional configurations, enhancing user ergonomics and reducing the overall depth required to deploy notebook computer 100 of the present invention. Main body 102 may serve as an easel to hold user reference materials, such as a handwritten document to be typed into a word processing application, for example. A user may open notebook computer 100 into a conventional configuration or may continue the same single smooth motion to fully deploy notebook computer 100 into the substantially vertical orientation as described above. Electrical signals that signify user input, such as keystrokes or TrackPoint (R) movements for example, may be communicated between keyboard 104 and main body 102 via pivot pins 108, which also mechanically connect keyboard 104 to the rest of notebook computer 100.

Figure 8:
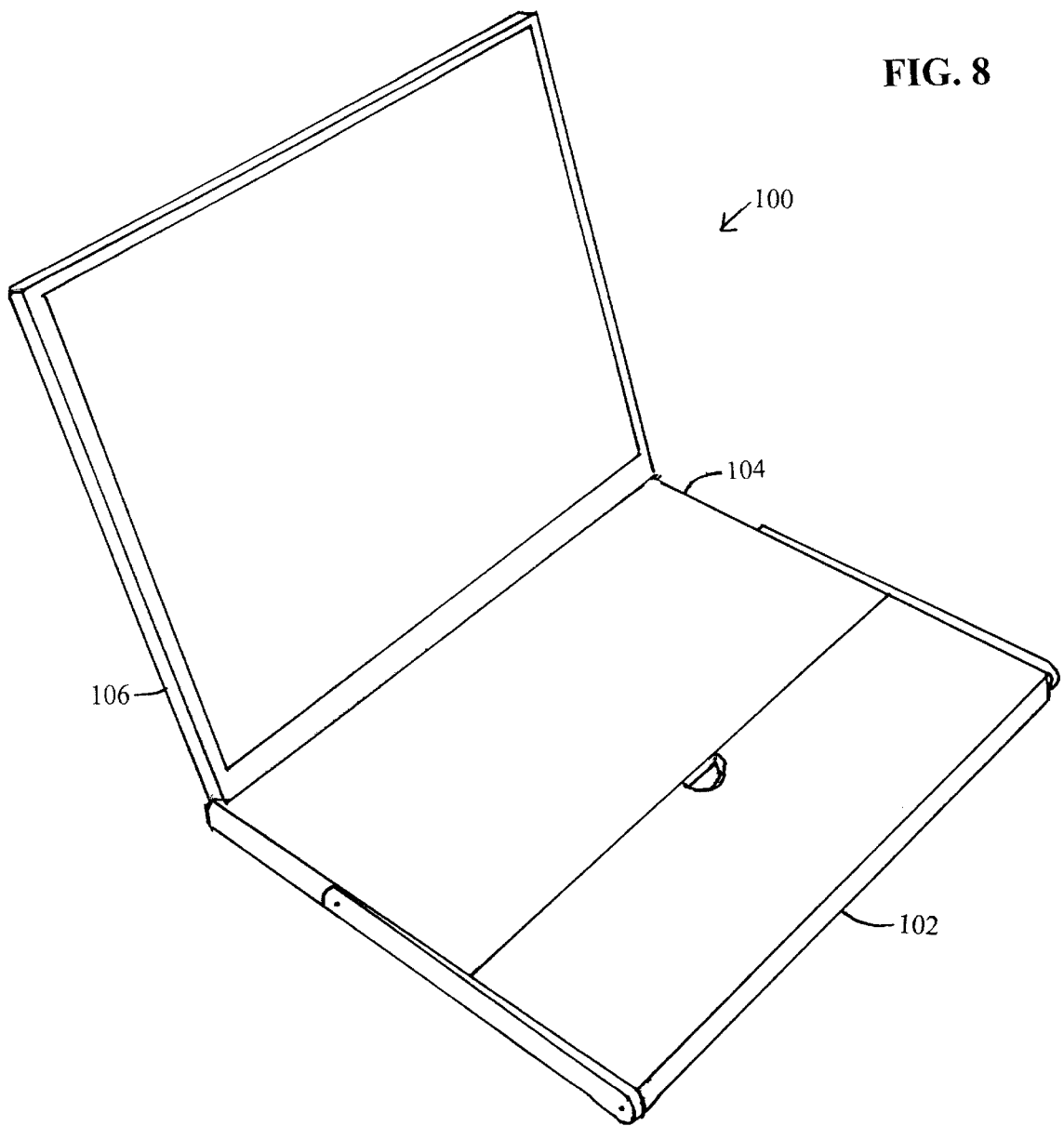
FIG. 8 is a perspective drawing of the second embodiment of the notebook computer according to the present invention in its conventional configuration.

Referring now to FIG. 8, the second embodiment of notebook computer 100 according to the present invention in its conventional configuration is shown. This embodiment also comprises main body 102, keyboard 104, and display 106, and is also operable in a conventional clamshell configuration.

Figure 9:
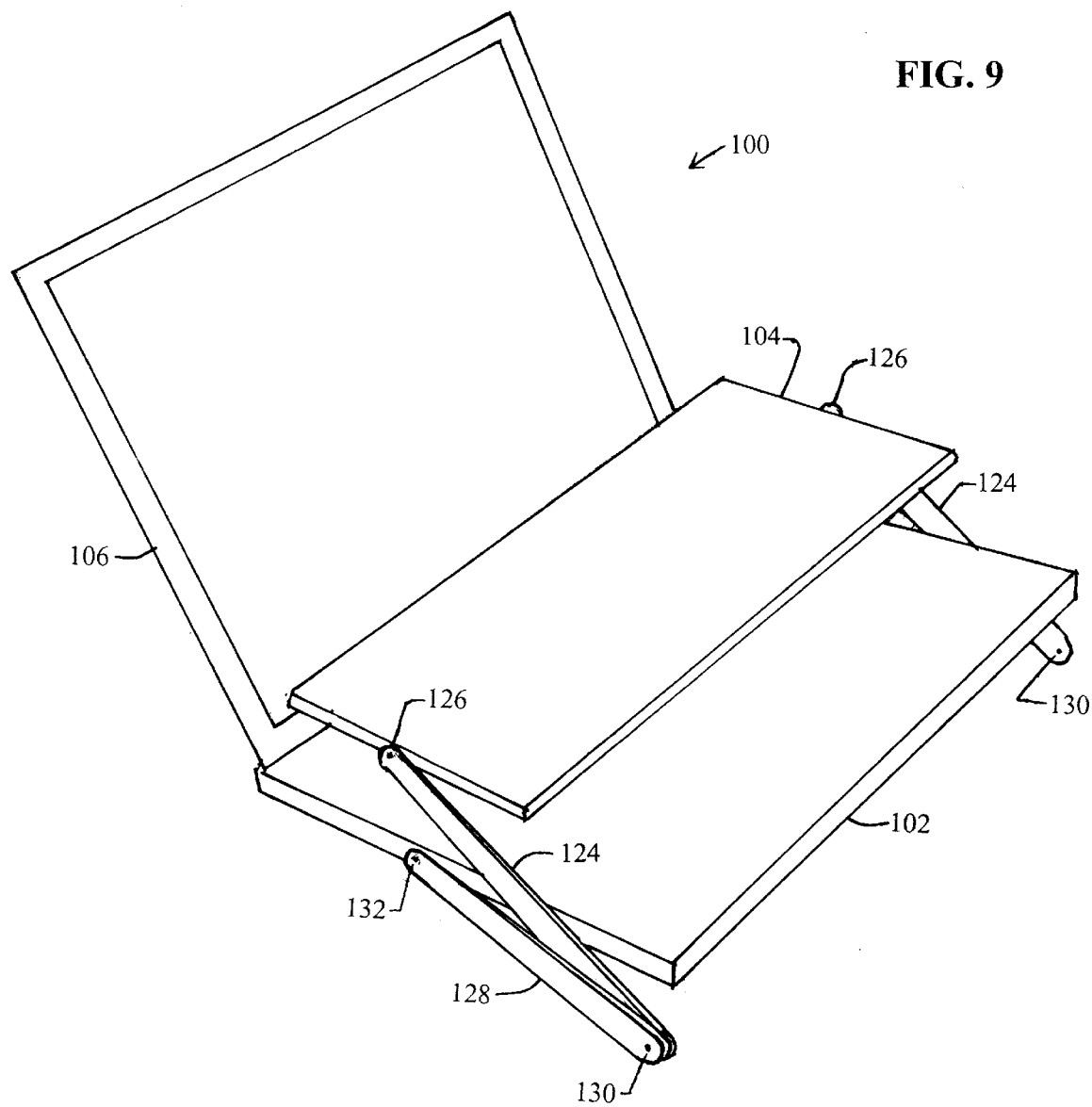
FIG. 9 is a perspective drawing of the second embodiment of the notebook computer according to the present invention with the keyboard lifting away from the main body.

Referring now to FIG. 9, the second embodiment of notebook computer 100 according to the present invention is shown with keyboard 104 lifting away from main body 102. Keyboard 104 is connected to one end of forearm strut 124 by wrist pivot pin 126. The opposite end of forearm strut 124 is connected to upper arm strut 128 by elbow pivot pin 130. The opposite end of upper arm strut 128 is connected to main body 102 by shoulder pivot pin 132. Keyboard 104 may therefore be deployed by a user in one smooth motion, unfolding as the user lifts display 106 with one hand and pulls keyboard 104 with the other hand.

Figure 10:
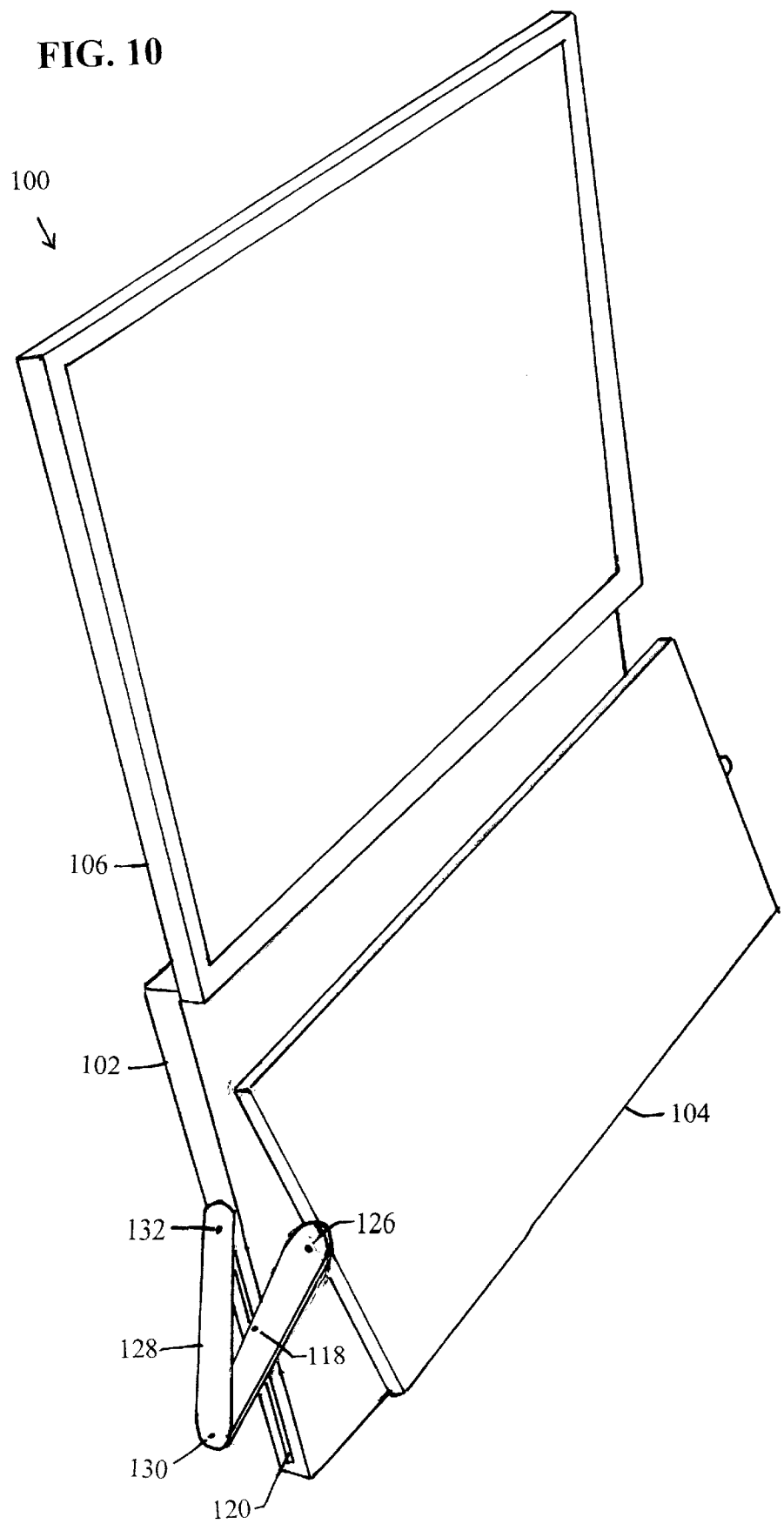
FIG. 10 is a perspective drawing of the second embodiment of the notebook computer according to the present invention with the display and the main body in a substantially vertical orientation, and the keyboard unfolding.

Referring now to FIG. 10, the second embodiment of notebook computer 100 according to the present invention is shown, with display 106 and main body 102 in a substantially vertical orientation and keyboard 104 unfolding. The motion of keyboard 104 is constrained by sliding pins 118 which extend through forearm struts 124 to engage guide channels 120 on main body 102.

Figure 11:
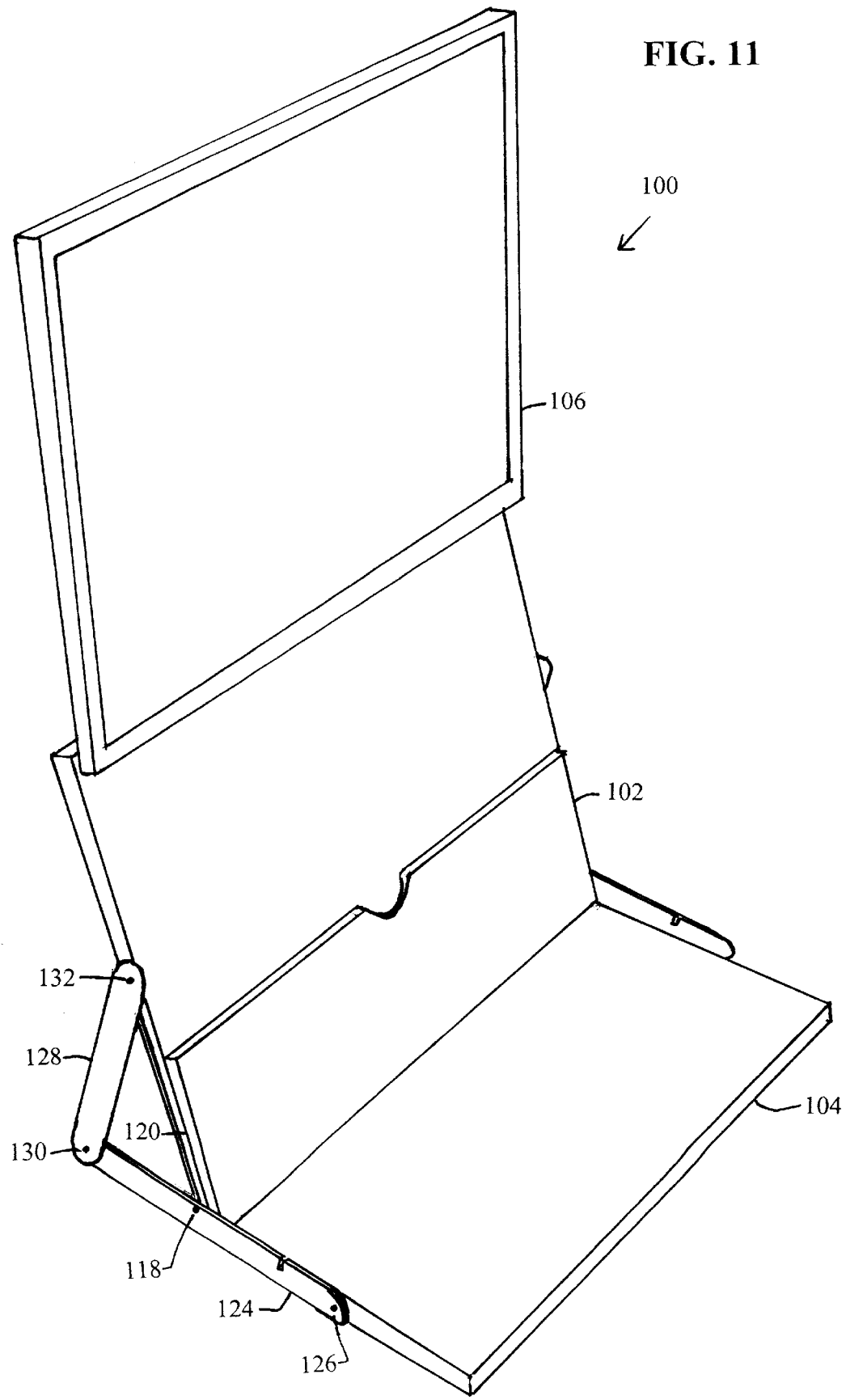
FIG. 11 is a perspective drawing of the second embodiment of the notebook computer in its fully deployed configuration according to the present invention.

Referring now to FIG. 11, the second embodiment of notebook computer 100 in its fully deployed configuration according to the present invention is shown. Upper arm struts 128 provide mechanical support for main body 102, and are prevented from sliding away by connection to main body 102 through forearm struts 124.

Figure 12:
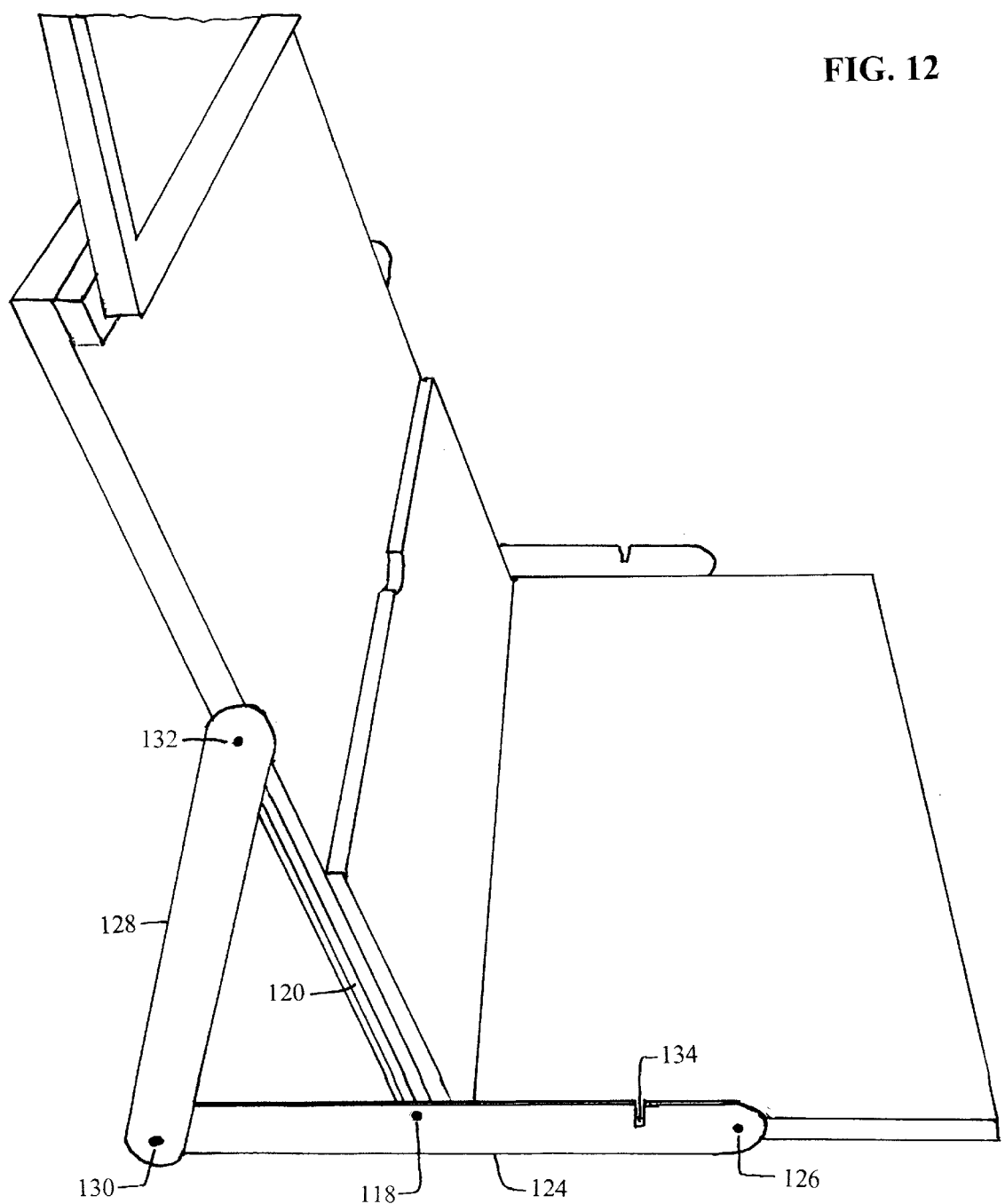
FIG. 12 is an enlarged perspective drawing of the second embodiment of the notebook computer in its fully deployed configuration according to the present invention.

Referring now to FIG. 12, the second embodiment of notebook computer 100 in its fully deployed configuration according to the present invention is shown in greater detail. Notches 134 in forearm struts 124 enable forearm struts 124 to completely fold and rest alongside upper arm struts 128 and alongside main body 102 when notebook computer 100 is closed.

Figure 13A:
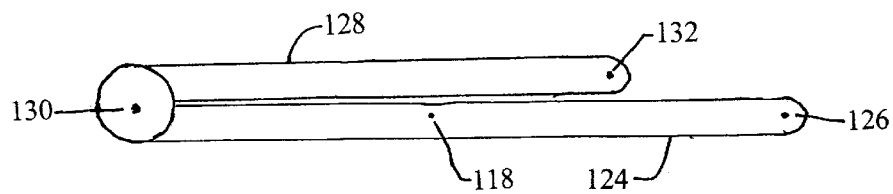
FIGS. 13A and 13B are enlarged perspective drawings of an alternate hinge configuration for the second embodiment of the notebook computer according to the present invention.
Figure 13B:
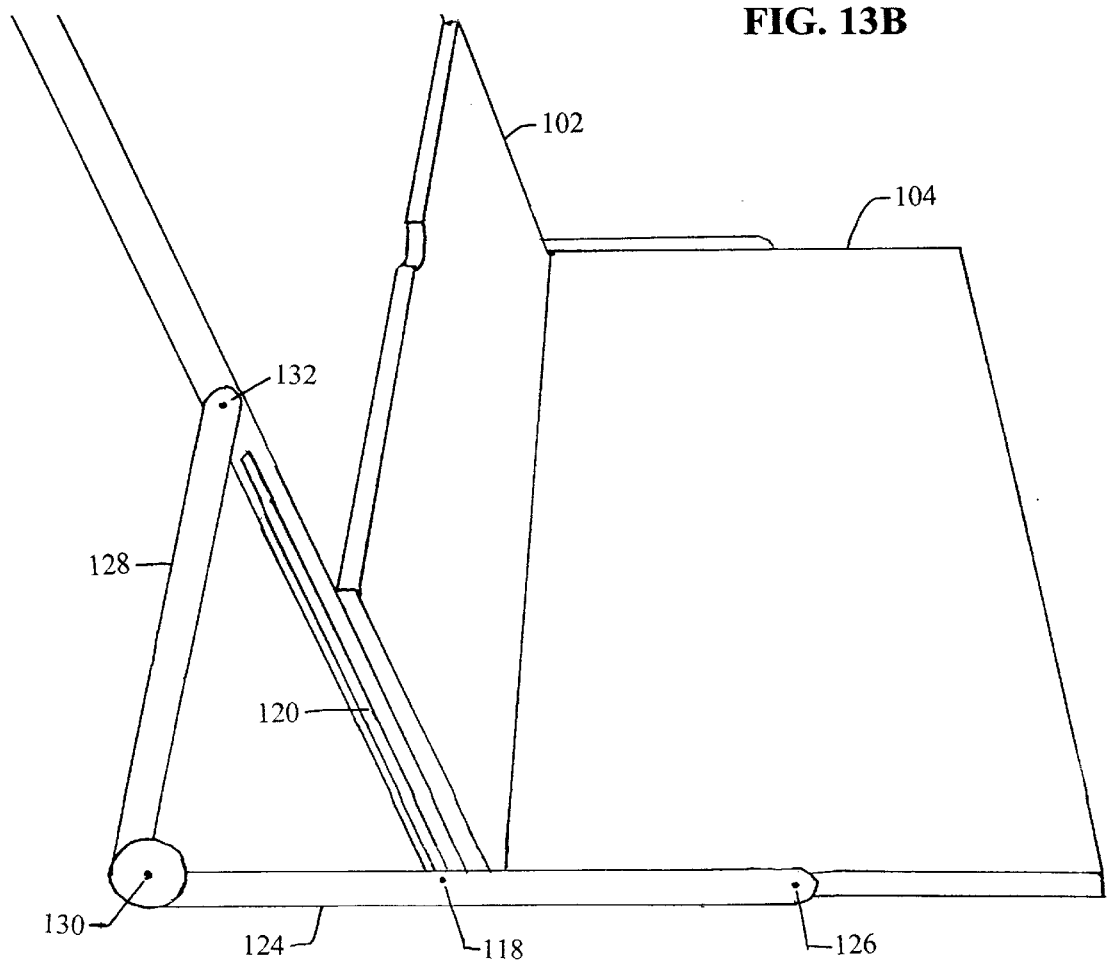

Referring now to FIG. 13A and FIG. 13B, an alternate hinge configuration for the second embodiment of notebook computer 100 is shown. In this configuration, forearm struts 124 rest on top of upper arm struts 128 in a duckbill arrangement when notebook computer 100 is closed, instead of resting alongside in the scissors arrangement as shown in FIG. 12.

Figure 14:
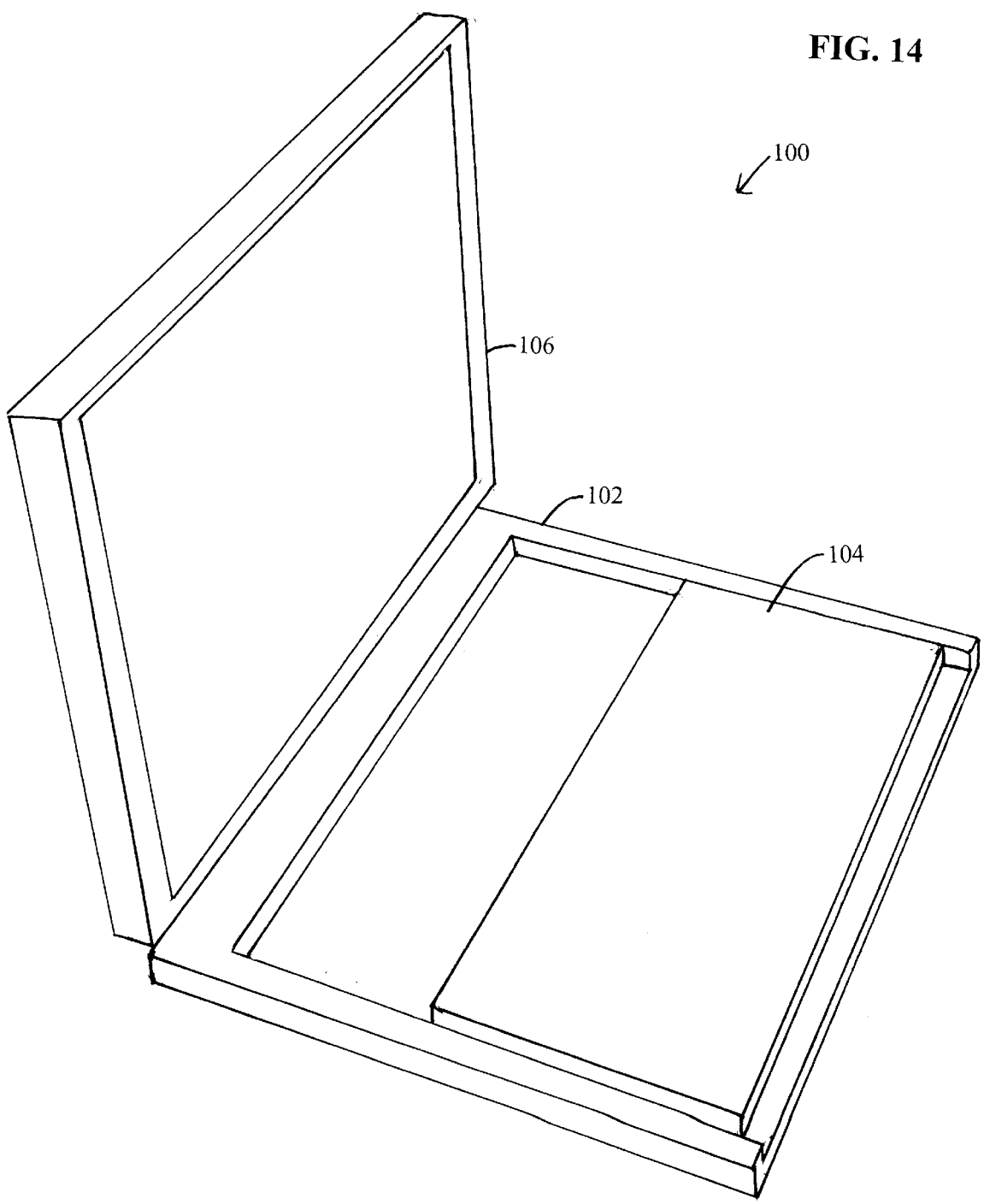
FIG. 14 is a perspective drawing of the third embodiment of the notebook computer according to the present invention in its conventional configuration.

Referring now to FIG. 14, the third embodiment of notebook computer 100 according to the present invention in its conventional configuration is shown. This embodiment comprises main body 102, keyboard 104, and display 106, and is also operable in a conventional configuration.

Figure 15:
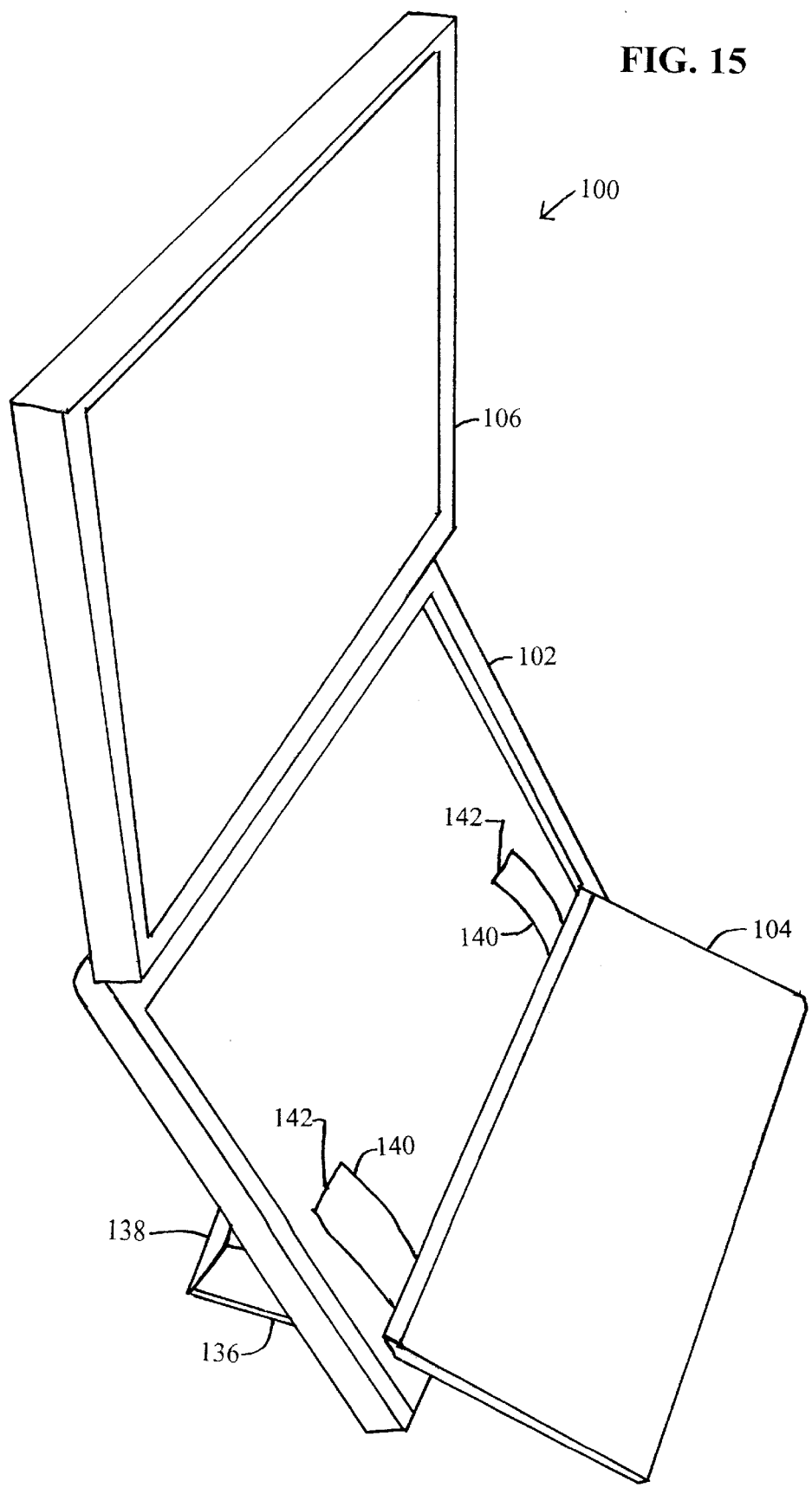
FIG. 15 is a perspective drawing of the third embodiment of the notebook computer according to the present invention with the keyboard partially deployed.

Referring now to FIG. 15, the third embodiment of notebook computer 100 according to the present invention is shown with keyboard 104 partially deployed and display 106 lifted into a substantially vertical orientation. Lower struts 136 are pivotably connected to a lower portion of main body 102 and pivotably connected to one end of upper struts 138. Upper struts 138 are connected to ribbons 140 that extend through slots 142 in main body 102.

Figure 16:
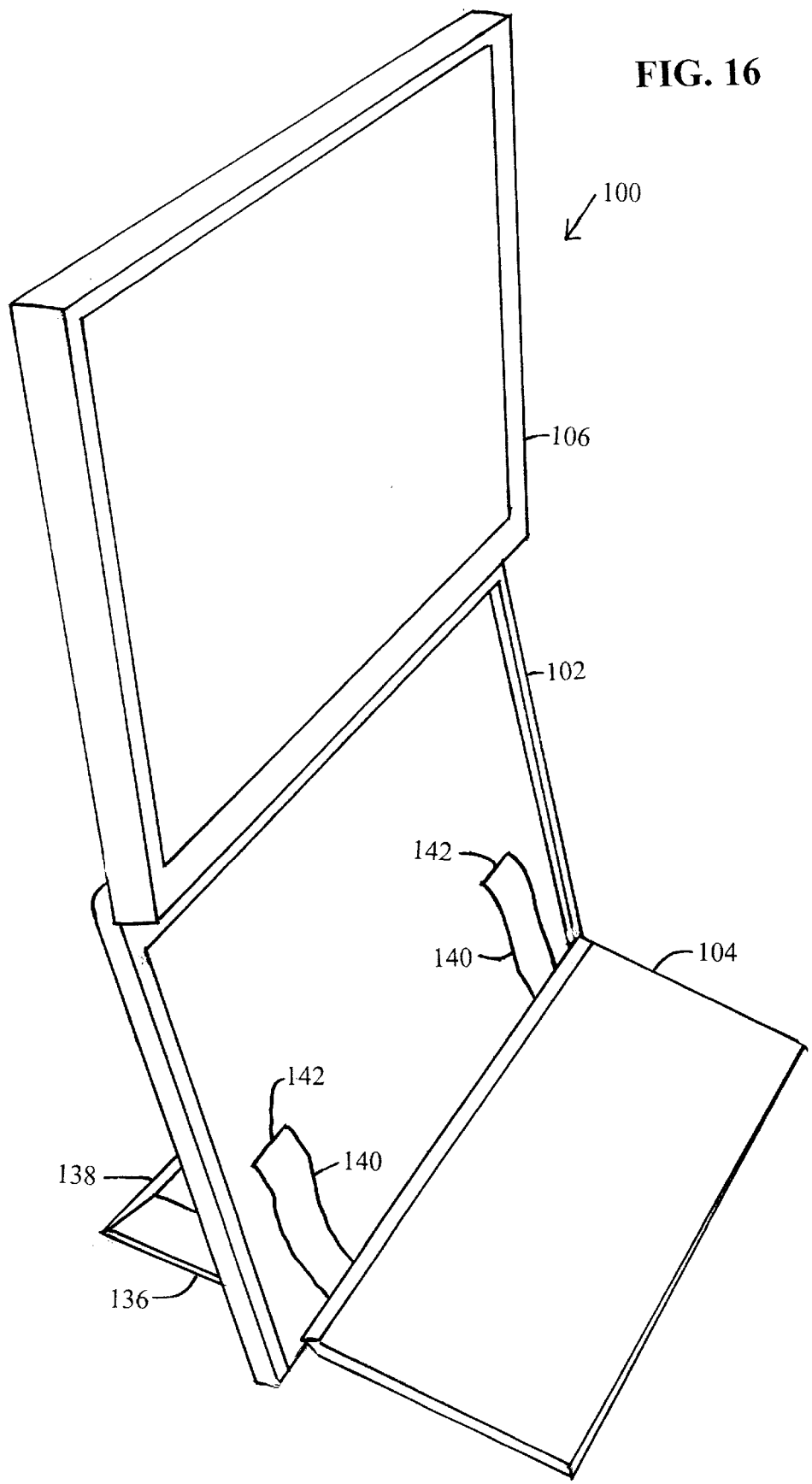
FIG. 16 is a perspective drawing of the third embodiment of the notebook computer in its fully deployed configuration according to the present invention.

Referring now to FIG. 16, the third embodiment of notebook computer 100 in its fully deployed configuration according to the present invention is shown. Main body 102 is now in a substantially vertical orientation. Keyboard 104 rests on the horizontal support surface when fully deployed. Ribbons 140 have pulled upper struts 138 downward into a locking position to provide support for main body 102.

Figure 17:
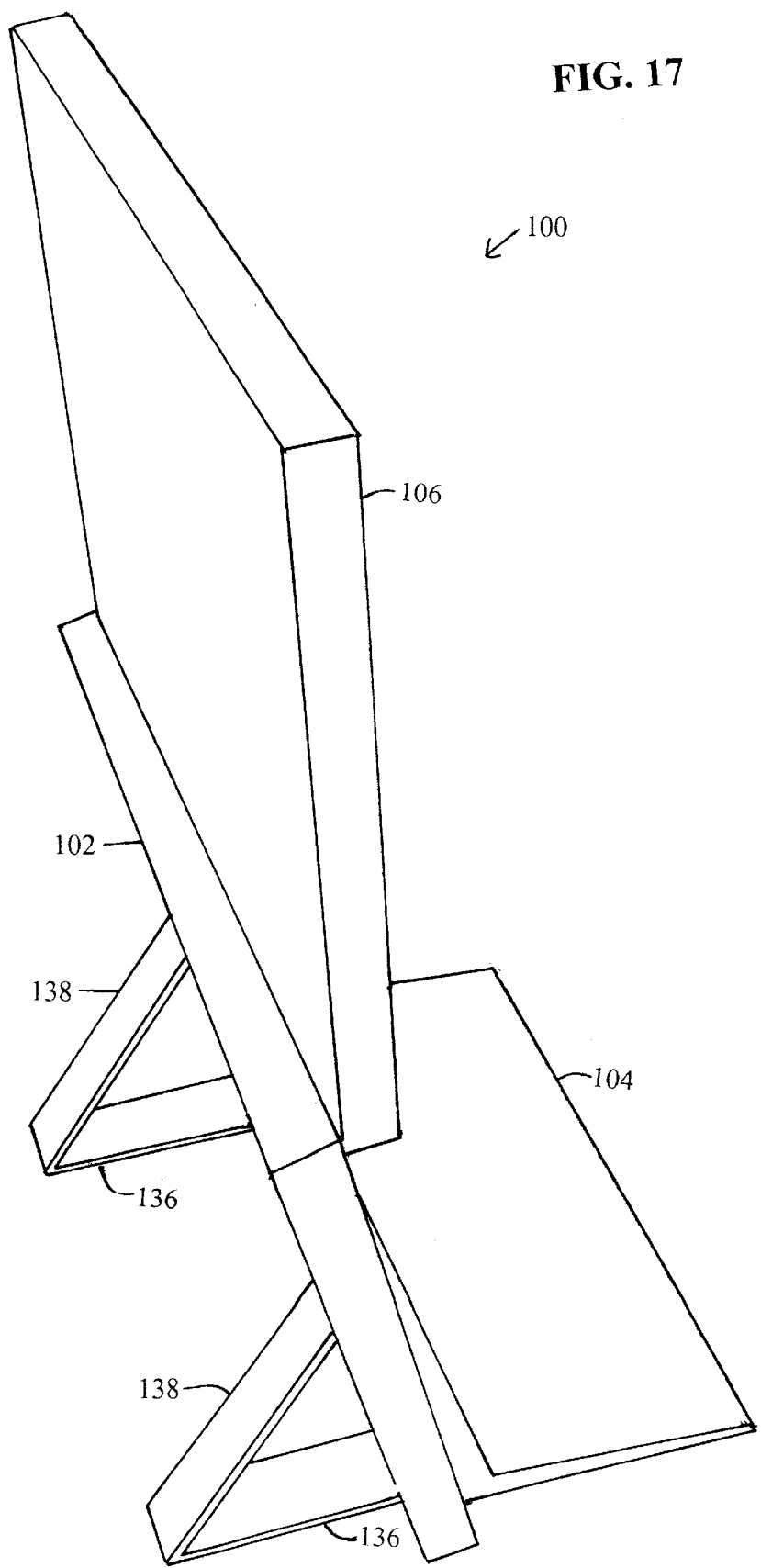
FIG. 17 is a perspective drawing of the rear view of the third embodiment of the notebook computer in its fully deployed configuration according to the present invention.

Referring now to FIG. 17, the rear view of the third embodiment of notebook computer 100 in its fully deployed configuration according to the present invention is shown. Upper struts 138 and lower struts 136 are constrained to move within main body 102 during deployment, and rest substantially flush with main body 102 when notebook computer 100 is closed.

Figure 18:
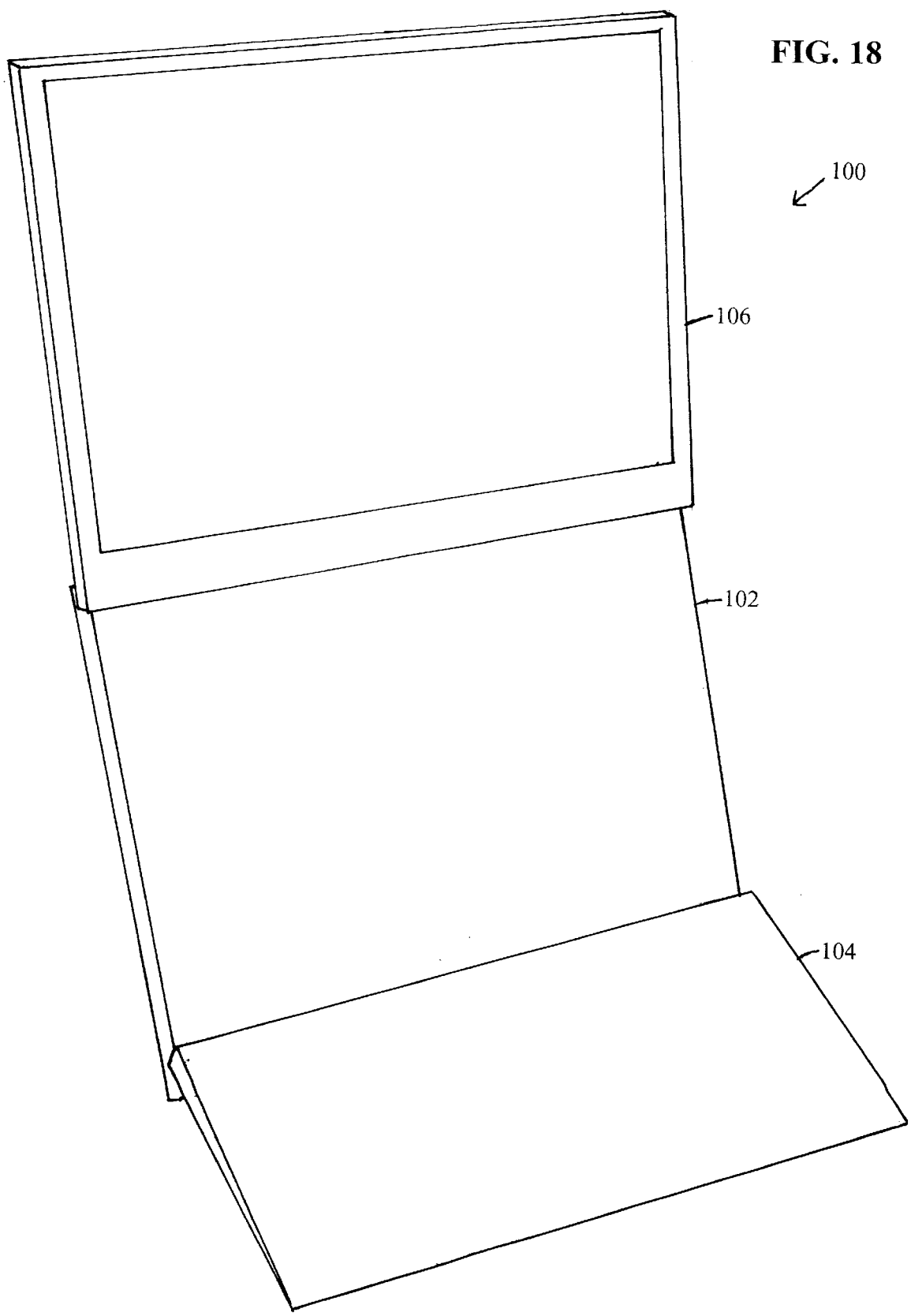
FIG. 18 is a perspective drawing of the fourth embodiment of the notebook computer in its fully deployed configuration according to the present invention.
Figure 19A:
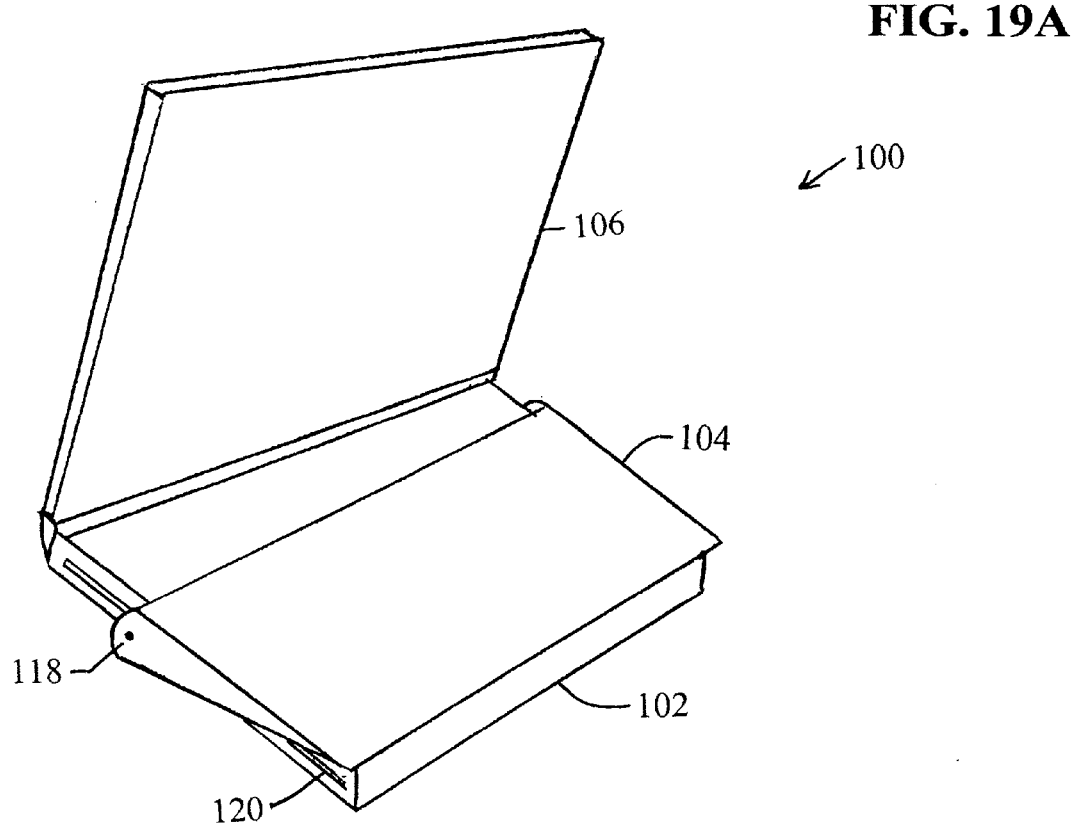
FIGS. 19A and 19B are perspective drawings of the keyboard of the fourth embodiment of the notebook computer according to the present invention.
Figure 19B:
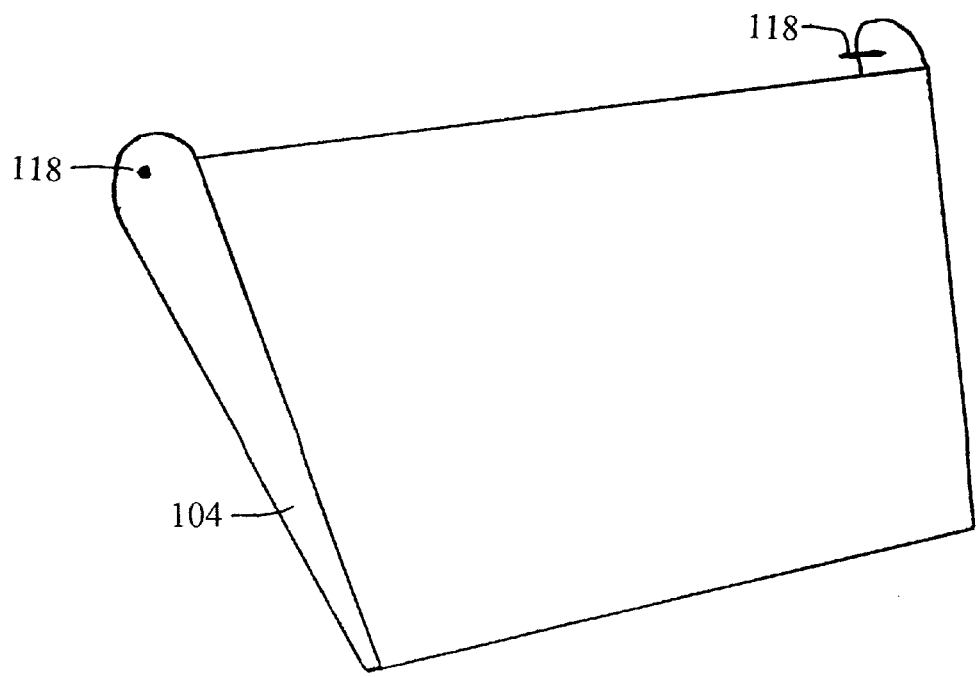

Referring now to FIG. 18, the fourth embodiment of notebook computer 100 in its fully deployed configuration according to the present invention is shown. This embodiment also comprises main body 102, keyboard 104, and display 106, and is also operable in a conventional configuration. Keyboard 104 rests on the horizontal support surface when deployed and is connected to main body 102 by sliding pins 118, located underneath keyboard 104, that engage guide channels 120. FIGS. 19A and 19B depict keyboard 104 and sliding pins 118 of this embodiment in more detail. Main body 102 and display 106 are maintained in a substantially vertical orientation when deployed.

Figure 20:
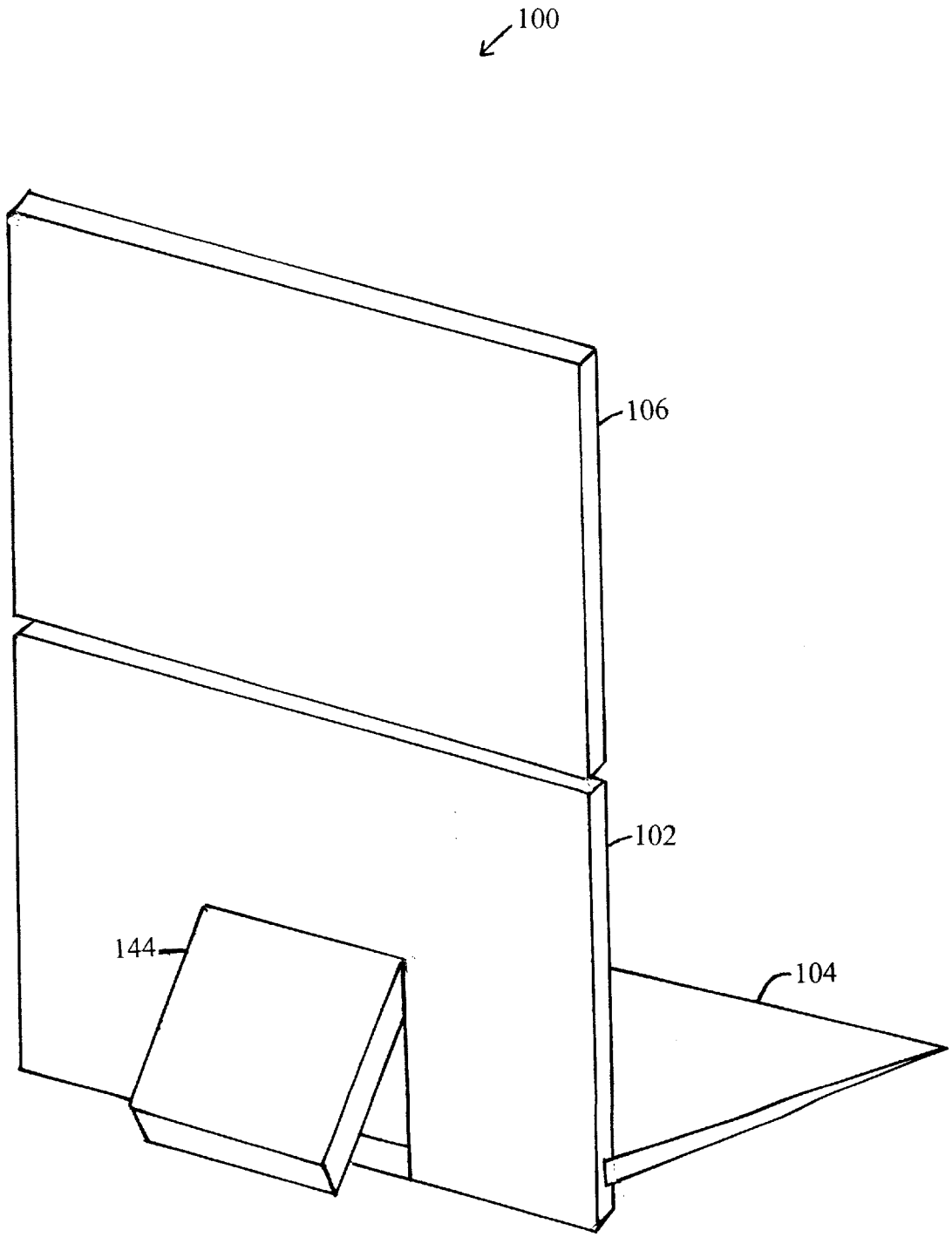
FIG. 20 is a perspective drawing of the rear view of the fourth embodiment of the notebook computer in its fully deployed configuration according to the present invention.

Referring now to FIG. 20, the rear view of the fourth embodiment of notebook computer 100 in its fully deployed configuration according to the present invention is shown. This embodiment features a battery 144 pivotably attached to a rear portion of main body 102. When notebook computer 100 is closed, battery 144 is housed substantially flush with main body 102. During deployment, battery 144 pivots rearward to provide mechanical support for main body 102, and, indirectly, display 106. Battery 144 may pivot around a horizontal axis as shown, or around a vertical axis (not shown). The weight of keyboard 104 further supports main body 102.

Figure 21:
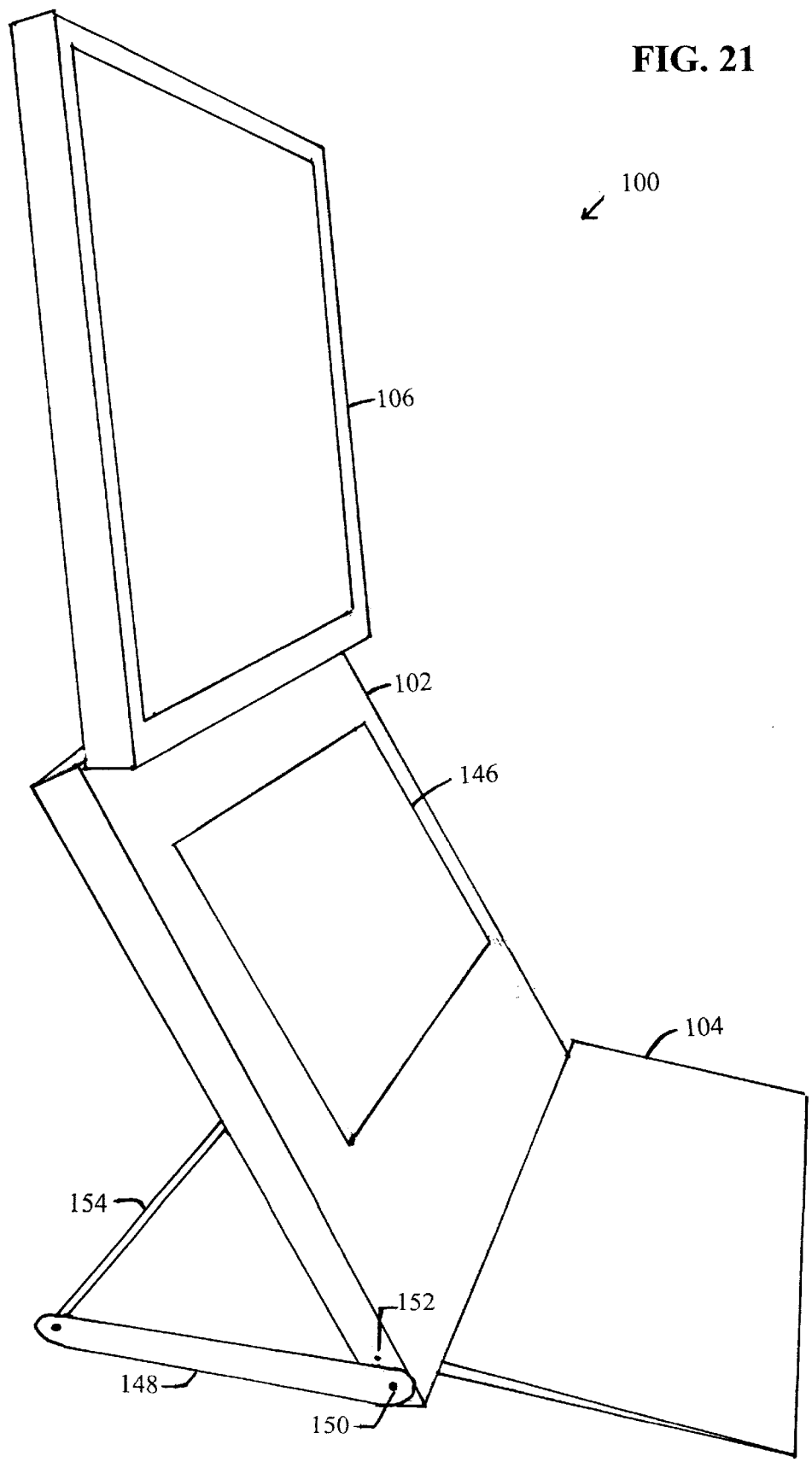
FIG. 21 is a perspective drawing of the fifth embodiment of the notebook computer in its fully deployed configuration according to the present invention.

Referring now to FIG. 21, the fifth embodiment of notebook computer 100 is shown in its fully deployed configuration according to the present invention. This embodiment also comprises main body 102, keyboard 104, and display 106. Keyboard 104 is pivotably attached to main body 102 and rests on the horizontal support surface when deployed. A second display 146 is disposed on main body 102. Display 106 and second display 146 both face the user when notebook computer 100 is fully deployed. One of the displays may be used to present the Windows (R) desktop, for example, during operation while another may be dedicated entirely to a single application. Support struts 148 are connected to the lower portions of main body 102 with hinge pins 150. Detent mechanisms 152 allow support struts 148 to rest alongside main body 102 when notebook computer 100 is closed and to rest on the horizontal support surface and provide mechanical support to maintain main body 102 in a substantially vertical orientation when notebook computer 100 is deployed. Horizontal support bar 154 is connected to support struts 148 to provide further mechanical stability.

While the invention has been described with respect to an illustrative embodiment thereof, it will be understood that various changes may be made in the apparatus and means herein described without departing from the scope and teaching of the invention. It will be readily appreciated by those of skill in this particular art that the structures representatively described above may also be advantageously incorporated in other types of electronic devices such as calculators, other types of computers, PDAs (Personal Data Assistants), and PIMs (Personal Information Managers). Accordingly, the described embodiment is to be considered merely exemplary and the invention is not to be limited except as specified in the attached claims.

We claim:

1. A notebook computer comprising:
a main body oriented substantially vertically for improved heat dissipation;
a keyboard; and
a display pivotably attached to an upper portion of said main body and supported in a substantially vertical orientation by said main body for improved ergonomic positioning.

2. The notebook computer of claim 1 wherein said main body serves as an easel for supporting reference materials.

3. The notebook computer of claim 1 wherein said substantially vertical orientation enhances radiant heat dissipation.

4. The notebook computer of claim 1 wherein said substantially vertical orientation enhances convective heat dissipation.

5. The notebook computer of claim 1 wherein said notebook computer is also operable in a conventional clamshell configuration.

6. The notebook computer of claim 1 wherein said notebook computer is opened by a user applying force with both hands in one smooth motion.

7. The notebook computer of claim 1 wherein said notebook computer spans significantly less depth when fully deployed than when in a conventional clamshell configuration.

8. The notebook computer of claim 1 wherein said keyboard rests upon said main body and, when said notebook computer is fully deployed, said keyboard rests on a horizontal support surface for improved ergonomic positioning.

9. The notebook computer of claim 1 wherein said keyboard rotates downward on pivot pins on upper corners of said keyboard for improved ergonomic positioning.

10. The notebook computer of claim 1 wherein pivot pins mechanically and electrically connect said keyboard to said main body.

11. The notebook computer of claim 1 further comprising a base frame having left and right vertical sides and a bottom member connecting said left and right vertical sides.

12. The notebook computer of claim 8 wherein said keyboard provides mechanical support to maintain said main body and said display in said substantially vertical orientation.

13. The notebook computer of claim 8 further comprising forearm struts connected to said keyboard with wrist pivot pins at one end and connected to upper arm struts with elbow pivot pins at the opposite end and connected to guide channels in said main body with sliding pins, with said upper arm struts connected to said main body with shoulder pivot pins, wherein said forearm struts and said upper arm struts rest alongside said main body when said notebook computer is closed.

14. The notebook computer of claim 8 further comprising lower struts pivotably connected to a lower portion of said main body and pivotably connected to upper struts, and ribbons passing through slots in said main body and connecting to said keyboard and said upper struts, wherein said upper struts and said lower struts fold substantially flush with said main body when said keyboard rests upon said main body, and wherein, when a user deploys said keyboard, said ribbons unfold said upper struts and said lower struts to support said main body in said substantially vertical orientation.

15. The notebook computer of claim 8 further comprising a battery pivotably attached to a rear portion of said main body and serving as a support member, when deployed, to maintain said main body in said substantially vertical orientation.

16. The notebook computer of claim 8 further comprising a second display disposed on said main body and facing a user, and support struts connected to a lower portion of said main body with hinge pins and detent mechanisms, and a horizontal support bar connected to said support struts to maintain said main body in said substantially vertical orientation.

17. The notebook computer of claim 11 wherein said keyboard is retained within said base frame by pivot pins extending through said left and right vertical sides into upper corners of said keyboard.

18. The notebook computer of claim 11 wherein pivot pins mechanically and electrically connect said keyboard to said base frame.

19. The notebook computer of claim 11 wherein said main body further comprises guide channels, each including a transverse portion, wherein said base frame further comprises sliding pins engaging said guide channels, enabling said main body to slide within said base frame and to rotate upward and lock into said substantially vertical orientation using said transverse portions.

* * * * *